C. J. HOLSLAG.
ALTERNATING CURRENT WELDING TRANSFORMER.
APPLICATION FILED JAN. 14, 1918.
1,305,361. Patented June 3, 1919.
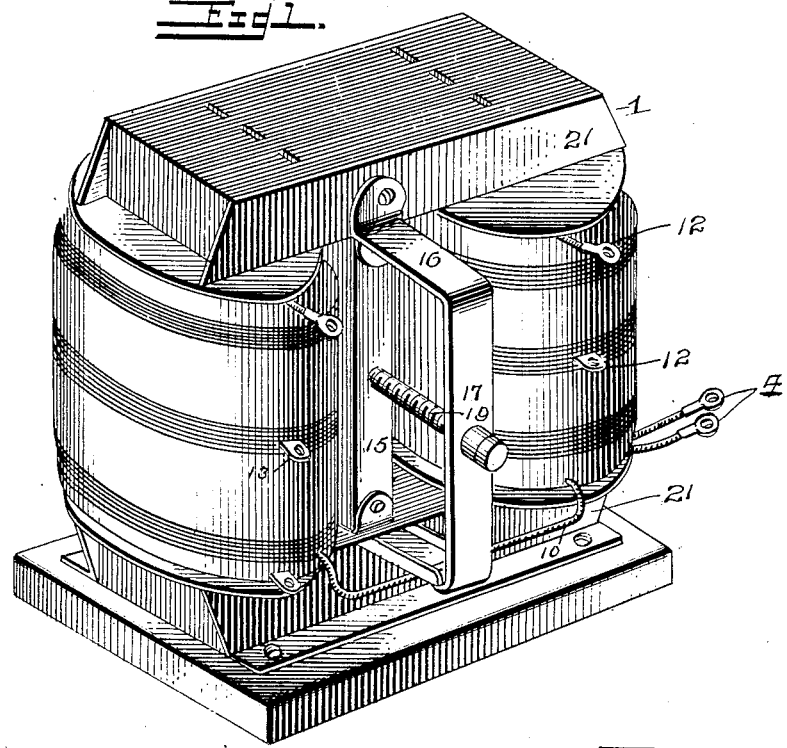
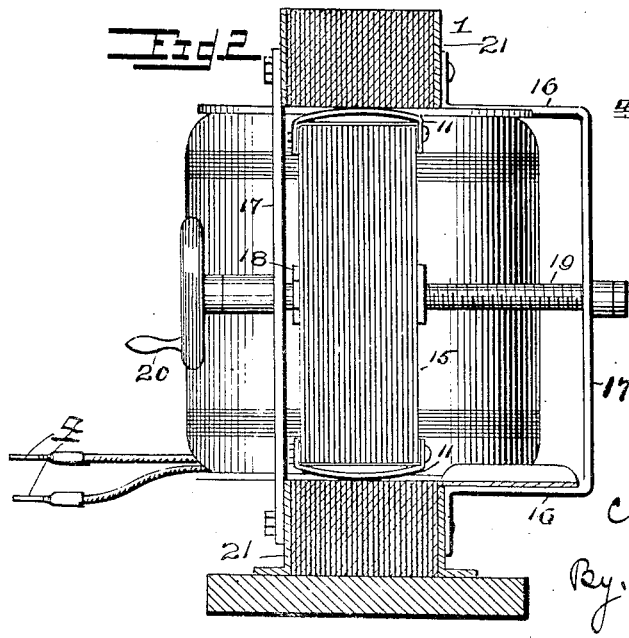
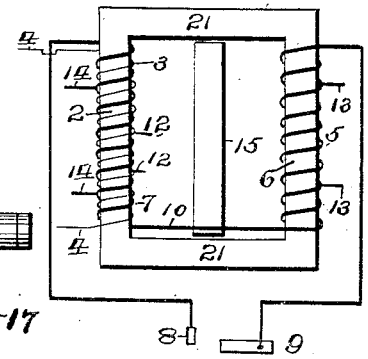
Inventor
Claude J. Holslag
By David A. Mead
Attorney

UNITED STATES PATENT OFFICE.

CLAUDE J. HOLSLAG, OF PEEKSKILL, NEW YORK.

ALTERNATING-CURRENT WELDING-TRANSFORMER.

1,305,361.  Specification of Letters Patent.  Patented June 3, 1919.

Application filed January 14, 1918. Serial No. 211,831.

*To all whom it may concern:*

Be it known that I, CLAUDE J. HOLSLAG, a citizen of the United States, residing at Peekskill, in the county of Westchester and State of New York, have invented certain new and useful Improvements in Alternating-Current Welding-Transformers, of which the following is a specification.

In the specification filed with my application No. 198,252, filed October 24, 1917, I have shown diagrammatically and described a means for using alternating current for electric arc welding and cutting. In the above mentioned application, I have pointed out characteristics which welding apparatus should possess and the results that should be obtained therefrom. I have also pointed out, in said application, the desirability of using alternating current and the difficulties attendant on its use. While the aforesaid mentioned application describes and illustrates a working mechanism for cutting and welding by alternating current, the present application covers a commercial development of the invention referred to in said earlier application.

I have found that an improved control and regulation of the welding or cutting arc is obtained by arranging the windings on the core so that a portion of the secondary winding is commingled or closely intermingled with the primary winding and the balance of the secondary winding wound on the core remote from the primary, the reasons for which will be hereinafter pointed out.

In order to get suitable control and regulation of the arc for various kinds of work, means are provided, as in my aforesaid application, for directing the flux as well as providing taps on the windings in order to vary their effective lengths. It will be understood that after the machine is set to perform a certain class of work no further adjustment is required as the apparatus is then automatic in the control of the arc, the voltage for which is delivered directly at the terminals of the machine without the intervention of outside regulating devices.

From the drawings attached hereto and the description, it will be seen that this form of commercial development, as shown and described, is very small and compact and thus easily portable.

In the drawings, Figure 1 is a perspective view of the transformer used for producing the arc.

Fig. 2 is a vertical sectional view, particularly showing the means for adjusting the position of the flux controller.

Fig. 3 is a diagrammatic view showing the disposition, as closely as possible, of the windings employed.

Referring now to the details, 1 is a core, preferably laminated, and of the closed circuit type. Located on the leg 2 of the core is a primary winding 3 designed to be suitably connected through its terminals 4 with a source of alternating current. Arranged on another leg 6 of the core, remote from the leg 2 is a portion 5 of a secondary winding (which I preferably term the auxiliary secondary). The second portion 7 of the secondary winding (which I preferably term the main secondary) is arranged on the leg 2, and the turns thereof are intimately associated or commingled with those of the primary winding 3. This arrangement of the second portion of the secondary winding constitutes an important commercial development as I have demonstrated that the placing of a part of the secondary winding on the same leg of the core as that on which the primary is located in any other relation to the primary, as for instance, in the form of a coil along side of the primary coil, falls short in securing the very best results due to magnetic leakage of the flux set up by the two windings. A part of this difficulty may be overcome in my earlier construction wherein the primary and main secondary coils are diagrammatically shown arranged side by side, by increasing the number of turns on the main secondary coil which means the use of a larger conductor and a more expensive and heavier machine; therefore it is readily seen that the commercial development described herein reduces the cost and weight of the apparatus besides making it more efficient, since the method of winding the primary and main secondary coils, as above described, produces a relation therebetween such that the reactance factor between these two wind ings is extremely low, whereas the auxiliary secondary winding, which is remote from the main secondary winding has a high and variable reactance factor. The main and auxiliary secondary windings are connected as indicated by 10 and their outer terminals are connected, one to a cutting or welding electrode 8 and the other to the work 9 which is to be cut, welded or repaired. Each of the windings employed is provided at one or more intermediate points with taps which, by suitable connections permit of the use of the whole of each winding or of any desired portion thereof, in order that the best conditions may be obtained to meet the requirements for welding or cutting different metals either when clean or when having dirt, grease, oil, slag or the like on the parts to be operated upon. These taps on the primary coil 3 are indicated at 12 and those on the auxiliary secondary coil 5 by 13 and those on the main secondary coil by 14.

Interposed between the legs of the core is a flux controller 15, which, in the form shown, is composed of laminated bars of a length slightly less than the distance between the transverse portions 21 of the core. In order that the flux controller may be moved to any desired position relative to the transverse portions of the core to substantially close, wholly or in part, the magnetic circuit, or to be moved out of line with such portions to reduce its effect on such circuit, it is mounted on a frame consisting of the arms 16 secured to the transverse portions of the core and connecting bars 17 secured to the outer ends of the arms. The flux controller has in it an opening containing a nut 18 and receiving a screw 19. The ends of the screw are connected to the bars 17 in a manner to allow of the screw being freely rotated and to be retained against longitudinal movement. Attached to one end of the screw is a handle for convenience in turning the screw, and by the use of which the flux controller may quickly be moved to occupy the desired position relative to the core. Secured to each end of the bar 15 are outwardly extending brass springs 11, which bear upon the inner faces of the respective transverse portions of the core. The frictional contact between the screw and the nut 18 and that of the springs on the core are sufficient to retain the flux controller in any position in which it may be placed against movement by reason of attraction exerted upon it when currents pass through the coils on the core.

In general the operation of the transformer herein shown and described is similar in many respects to that shown and described in my aforesaid application except that in the present case when there is a change in the power supply circuit tending to change the current in the primary winding from a value found to be best adapted for the work being done at the arc in the secondary circuit, the main secondary coil, which is closely interlinked with the primary coil, instantaneously develops additional magnetic flux which acts quickly in opposition to the change in the primary circuit, retarding it sufficiently to establish a condition first determined upon as best suited for the work. This particular action is much more pronounced in the present arrangement herein shown and described than where the primary and main secondary are separate. Furthermore, as already pointed out the reactance factor between the primary and main secondary coil is extremely low while the reactance factor of the auxiliary secondary coil, which is located on the leg remote from the leg carrying the primary and main secondary coil, is high and variable so that the auxiliary secondary coil serves to produce a puncture or guardian voltage adapted to vary rapidly to suit the conditions of the arc, thus making it possible to use any kind of an electrode with my welding apparatus, i. e., either slag or other covered electrodes or bare electrodes.

In addition to the benefits obtained as already pointed out by intermingling the main secondary with the primary winding, an additional advantage is obtained by an increased efficiency since practically all of the magnetic flux set up by the primary acts on the main secondary turns thereby generating a more constant E. M. F. in this part of the secondary winding than is possible in other associations of these coils, and a hotter arc results.

As a result of the automatic control of current by the means described I am able to produce an improved commercial alternating current welding apparatus which delivers its welding voltage directly at the terminals of the machine without the necessity of any outside resistances, reactances or other regulating devices and one that is so economical in the use of current that a single phase machine meets practically all requirements and can be operated from one phase of a polyphase circuit without any difficulty. Further the machine is light in weight, so that two men can readily pick it up and carry it to any place where it is desired to be used, and an apparatus which does all the work formerly performed by a large motor generator set weighing several times as much and costing a great deal more.

While I have shown and described an improved commercial development of my invention, I do not wish to be limited to the exact details; as numerous changes may be made, for instance, the use of an electrically operated flux controller instead of a mechanical controller; except as set forth in the appended claims.

Having thus described my invention, what I claim is:—

1. Apparatus utilizing alternating current for metallic arc welding, cutting and repairing including a transformer having a magnetizable core with primary and secondary windings thereon, a part of the secondary being associated with the primary, while the balance of the secondary is located on the core remote from the primary and said first part, whereby the magnetic flux is directed in paths to meet varying conditions of the welding, cutting and repairing operations.

2. Apparatus utilizing alternating current for metallic arc welding, cutting and repairing including a transformer having a magnetizable core with primary and secondary windings thereon, a part of the secondary being associated with the primary, while the balance of the secondary is located on the core remote from the primary and said first part, whereby the magnetic flux is directed in paths to meet varying conditions of the welding, cutting and repairing operations, and a flux controller to assist in directing the magnetic flux.

3. Apparatus utilizing alternating current for metallic arc welding, cutting and repairing including a transformer having a magnetizable core with primary and secondary windings thereon, a part of the secondary being associated with the primary, while the balance of the secondary is located on the core remote from the primary and said first part, whereby the magnetic flux is directed in paths to meet varying conditions of the welding, cutting and repairing operations, and taps on said windings to vary their effective lengths.

4. Apparatus utilizing alternating current for electric arc welding, cutting and repairing, including a transformer having a closed circuit core with primary and secondary windings thereon, a part of the secondary being intermingled with the primary while the balance of the secondary is located on the core remote from the primary and said first part whereby the magnetic flux is directed in paths to meet very rapidly the varying conditions of the welding, cutting or repairing operations.

5. Apparatus utilizing alternating current for electric arc welding, cutting and repairing, including a transformer having a closed circuit core with primary and secondary windings thereon, a part of the secondary being intermingled with the primary while the balance of the secondary is located on the core remote from the primary and said first part whereby the magnetic flux is directed in paths to meet very rapidly the varying conditions of the welding, cutting or repairing operations, and a flux controller to assist in controlling the amount of flux passing through the said remote secondary portion.

6. Apparatus utilizing alternating current for electric arc welding, cutting and repairing, including a transformer having a closed circuit core with primary and secondary windings thereon, a part of the secondary being intermingled with the primary while the balance of the secondary is located on the core remote from the primary whereby the magnetic flux is directed in paths to meet very rapidly the varying conditions of the welding, cutting or repairing operations, and a flux controller to assist in controlling the amount of flux passing through the said remote secondary portion, said flux controller being adjusted by a screw mechanism supported by a frame preferably attached to the core.

7. Apparatus utilizing alternating current for metallic arc welding, cutting and repairing, including a transformer having preferably a closed circuit core with primary and secondary windings so arranged thereon that a resultant secondary E. M. F. is produced across the arc, struck by an electrode connected to one terminal of the secondary and the material to be welded, cut or repaired connected to the other terminal of the secondary, such that said resultant E. M. F. passes from a prolonged maximum value of one polarity to a prolonged maximum value of opposite polarity.

8. Apparatus utilizing alternating current for metallic arc welding, cutting and repairing, including a transformer having preferably a closed circuit core with primary and secondary windings thereon, said secondary being divided in two portions, one of which generates substantially a uniform part of the working E. M. F. and the other portion a non-uniform E. M. F. which acts to modify the effect of the E. M. F. generated by the first portion whereby a steady arc is maintained between a movable electrode connected to one terminal of the secondary and the material to be welded, cut or repaired connected to the other terminal of the secondary.

9. Apparatus utilizing alternating current for metallic arc welding, cutting or repairing, including a transformer having preferably a closed circuit core with primary and secondary windings thereon, said secondary winding being divided in two portions, one of which is associated with the primary and the other portion on a part of the core remote from the primary and first portion whereby the two portions of the secondary generate E. M. F's. which combine to maintain an arc when such arc is struck between metal electrodes connected to the secondary terminals.

10. Apparatus utilizing alternating current for metallic arc welding, cutting or repairing, including a transformer having preferably a closed circuit core with primary and secondary windings thereon, said secondary winding being divided in two portions, one of which is associated with the primary and the other portion on a part of the core remote from the primary and first portion, said second portion generating an E. M. F. which acts as a puncturing voltage to respond to changes in the welding, cutting or repairing conditions of the arc established between metal electrodes adapted to be connected to the terminals of the secondary of the transformer.

11. Apparatus utilizing alternating current for metallic arc welding, cutting and repairing, including a transformer having preferably a closed circuit core with primary and secondary windings thereon, said secondary winding being divided in two portions, one of which is associated with the primary and the other portion on a part of the core remote from the primary and first portion, said second portion generating an E. M. F. which is adapted to be shifted in phase relation with reference to the E. M. F. generated by the first portion whereby a resultant E. M. F. is obtained across the arc established between metal electrodes connected to the terminals of the secondary of the transformer.

12. Apparatus utilizing alternating current for metallic arc welding, cutting and repairing, including a transformer having preferably a closed circuit core with primary and secondary windings thereon, said secondary winding being divided in two portions, one of which is associated with the primary and the other portion on a part of the core remote from the primary and first portion, each said portions generating E. M. F's. of different characteristics combining when an arc is struck to produce an E. M. F. which reciprocates across the metal arc electrodes connected to the secondary terminal with a sudden change between substantial maxima of different polarity.

13. Apparatus utilizing alternating current for electric arc welding, cutting or repairing, including a transformer having a closed circuit core with primary and secondary windings thereon, characterized by one part of the secondary being closely intermingled with the primary so as to have a very low reactance factor while the other portion of the secondary is located remote from the primary and has a high and variable reactance factor whereby a very rapidly responding action is secured to meet varying conditions of the welding, cutting or repairing operations.

14. Apparatus utilizing alternating current for electric arc welding, cutting or repairing, including a transformer having a closed circuit core with primary and secondary windings thereon, characterized by one part of the secondary being closely intermingled with the primary whereby each of these windings in very rapidly responsive to changes in the circuit including the other; while the other part of the secondary is located remote from the primary and said first part whereby the effects of the first mentioned windings are regulated to suit the conditions of the arc circuit which includes both parts of said secondary.

15. Metallic arc cutting and welding apparatus including a transformer having a closed circuit core, a primary winding on one leg of the core, a secondary winding having a main portion thereof intermingled with the primary winding and an auxiliary portion on another leg of the core and a flux controller constructed and arranged to act on the main flux path inside the regular magnetic circuit embraced by the said windings.

16. Electric arc cutting, welding or repairing apparatus including an alternating current transformer having a closed circuit core with means on the core adapted to be connected to a source of primary current for energizing said core; series secondary windings on the core adapted to be connected to arc electrodes, one of said secondary windings being intimately subjected to the influence of the primary energizing means to furnish the uniform part of the induced E. M. F. in the secondary circuit, another secondary winding indirectly subjected to the influence of the primary energizing means to supply an E. M. F. which acts to limit the amount of current which will flow in the secondary circuit and which further assists in producing a persistent arc when the same is "struck" between said electrodes.

17. Electric arc cutting and welding apparatus including an alternating current transformer having a closed circuit core with a primary winding thereon; a subdivided secondary, the terminals of which are adapted to be connected directly to metallic arc electrodes, one portion of said secondary being intimately associated with said primary to generate the uniform portion of the working E. M. F., another portion of the secondary arranged on the core separated from the primary for generating a varying E. M. F. to regulate the watts used at the arc.

18. Apparatus utilizing alternating current for metallic arc welding, cutting and repairing, including a transformer having a magnetizable core with primary and secondary windings thereon, a part of the secondary being associated with the primary, while the balance of the secondary is located on the core remote from the primary and said first part, whereby the two parts coact so that the voltage required at the arc is delivered directly from the terminals of said secondary winding.

In testimony whereof I affix my signature.

CLAUDE J. HOLSLAG.